(12) United States Patent
Mermoz

(10) Patent No.: US 7,618,326 B2
(45) Date of Patent: Nov. 17, 2009

(54) COUPLING CAPABLE OF ACCOMMODATING LARGE ANGULAR AND AXIAL DISPLACEMENTS

(75) Inventor: Emmanuel Mermoz, Senas (FR)

(73) Assignee: Eurocopter, Marignane (FR)

( * ) Notice: Subject to any disclaimer, the term of this patent is extended or adjusted under 35 U.S.C. 154(b) by 287 days.

(21) Appl. No.: 11/167,110

(22) Filed: Jun. 28, 2005

(65) Prior Publication Data

US 2006/0003847 A1    Jan. 5, 2006

(30) Foreign Application Priority Data

Jun. 28, 2004    (FR) .................................. 04 07091

(51) Int. Cl.
*F16D 3/00*    (2006.01)
(52) U.S. Cl. ............................ 464/98; 464/99; 464/101
(58) Field of Classification Search .................... 464/98, 464/99, 101, 73, 79
See application file for complete search history.

(56) References Cited

U.S. PATENT DOCUMENTS

| | | | | | |
|---|---|---|---|---|---|
| 1,392,342 | A | * | 10/1921 | Laycock | 464/101 |
| 2,647,380 | A | * | 8/1953 | Troeger et al. | 464/99 |
| 3,500,660 | A | * | 3/1970 | Anderson | 464/99 |
| 5,158,504 | A | * | 10/1992 | Stocco | 464/99 |
| 5,387,157 | A | * | 2/1995 | Nameny | 464/98 |
| 6,145,419 | A | * | 11/2000 | Laycock | 82/1.11 |
| 2005/0255926 | A1 | * | 11/2005 | Piasecki et al. | 464/98 |

\* cited by examiner

*Primary Examiner*—Victor MacArthur
(74) *Attorney, Agent, or Firm*—Young & Thompson

(57) ABSTRACT

In the invention, a coupling device for interconnecting two substantially constant velocity systems or shafts (40, 41) includes two parallel plates (11, 12) united in their central region and forming a single part (10).

17 Claims, 3 Drawing Sheets

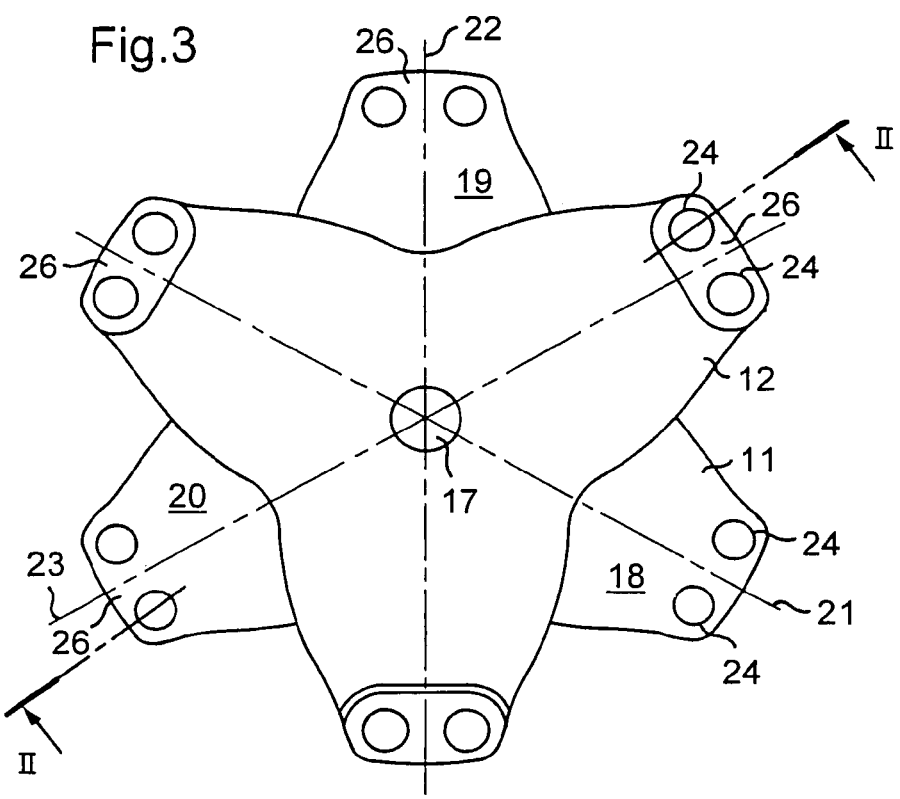
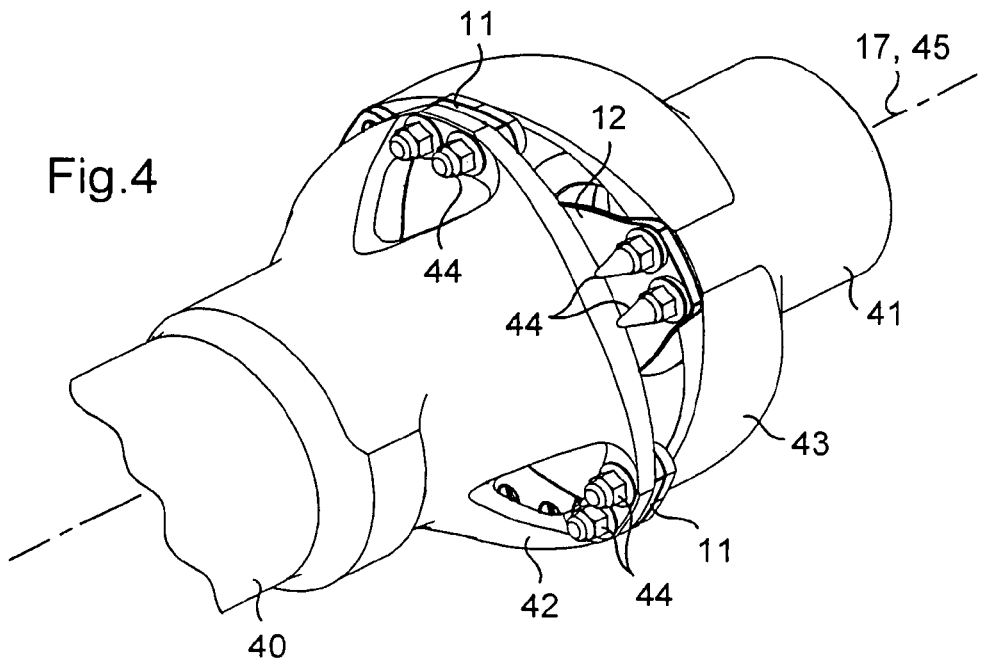

COUPLING CAPABLE OF ACCOMMODATING LARGE ANGULAR AND AXIAL DISPLACEMENTS

The present invention relates to a coupling device that can accommodate large angular and axial displacements.

The technical field of the invention is that of fabricating mechanical couplings that operate at substantially constant velocity.

BACKGROUND OF THE INVENTION

In numerous mechanical applications, the system generating mechanical power is remote from the receiver; on a helicopter, the tail rotor is often several meters away from the engine. The power needed to drive the rotor must be conveyed mechanically to the rotor by a so-called "transmission"; the driving torque may reach or exceed 1000 newton meters (Nm), and the speed of rotation may reach or exceed 20,000 revolutions per minute (rpm).

This distance leads to dispersions between the geometrical positions of the engine and the receiver. Dispersions in position between the engine and the receiver are the result either of manufacture, or of deformations under load caused by the system being in operation (for example the tail beam of a helicopter can deform when the tail rotor is in use).

OBJECTS AND SUMMARY OF THE INVENTION

It is therefore necessary to provide a transmission system that is capable of transmitting the required level of power in spite of any relative offset or misalignment between the engine and the receiver.

An object of the invention is thus to propose a mechanical system that enables high levels of torque to be transmitted, but that is also compatible with large amounts of axial and angular displacement within the transmission.

The coupling must also present a long lifetime and it must be light in weight.

The main drawback of known coupling devices is that they do not accommodate large axial and angular displacements; in addition, such devices are generally complex, expensive, and heavy.

An object of the invention is to propose a coupling device that is improved and/or that remedies, at least in part, the drawbacks of known coupling devices.

In a first aspect, the invention proposes a coupling device for connecting together two constant velocity systems or shafts turning about a common (theoretical) axis of rotation, the device comprising two parallel plates united via their central region and forming a single part; in a preferred embodiment, the plates (or flanges) are united by a hub or sleeve or tube of circular section, and form a single part together therewith.

Preferably, the sleeve presents a first inside diameter at each of its two axial ends, and presents a second inside diameter in its central (or middle) portion that is smaller than the first diameter; also preferably, the sleeve presents a thickness (measured in a radial plane parallel to the plate) that is greater in its central portion than in its end portion; this makes it possible to cause the mechanical stresses in the sleeve to be more uniform; this thus produces an axial orifice or passage through the sleeve that presents a shape that converges and then diverges.

Preferably, each of the plates has at least two identical arms, and in particular three arms that are offset at 120° intervals (i.e. regularly spaced apart in pairs by 120°) about the axis of the device (and of the sleeve), so as to form an isostatic device.

Each arm behaves like a beam having one end fixed in the hub and capable of deforming elastically and independently of the other arms, thereby giving the coupling increased ability to "compensate" for misalignment.

Also preferably, each plate and/or each arm presents a first thickness in a first (or central) region extending in the vicinity of the sleeve, a second thickness in a second (or peripheral) region extending in the vicinity of its peripheral end, and a third thickness in a third or intermediate region (or portion) extending between the first and second regions; the third thickness is less than the first thickness, and the thickness of the region between said two regions varies continuously in order to make the mechanical stresses in the arm or plates more uniform.

In order to enable each of the two plates to be fastened to a respective flange provided on each of the shafts to be coupled together, each plate (or flange or arm) of the coupling part is preferably pierced by at least one orifice or bore that extends through said peripheral region; and said second thickness is greater than said third thickness so as to reinforce the part in the vicinity of the bore(s).

In a preferred embodiment, each plate presents an outline in the form of a curvilinear isosceles triangle or in the form of a curvilinear hexagon, centered on the axis of rotation, with the plates being mutually offset angularly by 60° about the axis of the device that is orthogonal to the planes of the plates and that passes through the two respective centers of the two plates.

The part forming the plates and the sleeve or hub is preferably made of metal, in particular being made as a molding of titanium, or of steel, or of aluminum alloy, or else it is made of composite material, depending on the required levels of loading and deformation.

In a preferred embodiment, each arm is pierced by two identical bores and presents a zone surrounding these bores of thickness that is greater than the thickness of the middle region of the arm.

In another aspect of the invention, a metal blank is machined to produce a part that incorporates the plates and the hub. This method without welding avoids degrading the characteristics of the materials used and thus enables full advantage to be taken of the metallurgical characteristics of the base metal in all regions of the part.

The coupling of the invention is mounted at the interface between two mechanical transmission elements (gearing or transmission shaft) having relative positions that can vary axially with an amplitude of millimeter order, or angularly with an amplitude of degree order.

Each of the arms is fastened by a connection that ensures that it is fixed relative to the corresponding mechanical element; the technology used for making this connection is unimportant concerning the properties of the coupling.

The shape of the coupling is optimized so as to enable a high level of torque to be transferred while accepting large axial and angular offsets, and to do so using as little weight as possible.

The coupling of the invention has torque transmission capacities that are equivalent to or better than existing solutions; the invention makes it possible to manufacture a coupling device that enables torque of at least 500 Nm to be transmitted and in which the ratio of the torque that can be transmitted to the weight of the part constituted by the plates and the sleeve, if any, is greater than 1500 Nm/kg.

In addition, in a conventional configuration, in order to absorb axial displacements, the transmission generally needs to include a sliding connection between one of the shafts and a mechanical gearing element; with the coupling of the invention, it is no longer necessary to have a sliding coupling since the flexibility of the arms (or blades) serves to absorb the axial displacements of the transmission.

It is thus possible to design an entire helicopter transmission without a sliding connection, making use solely of couplings of the invention, which are located between two segments of transmission shaft and/or between a segment of shaft and a mechanical gearing element.

BRIEF DESCRIPTION OF THE DRAWINGS

Other characteristics and advantages of the invention appear in the following description which refers to the accompanying drawings, which show preferred embodiments of the invention without any limiting character.

FIGS. 2 and 3 are respectively a cross-section view and a plan view of the FIG. 1 part; FIG. 2 is a view on II-II of FIG. 3.

FIG. 4 is a perspective view showing portions of two shafts united by a coupling incorporating the part of FIG. 1.

MORE DETAILED DESCRIPTION

Figure 2:
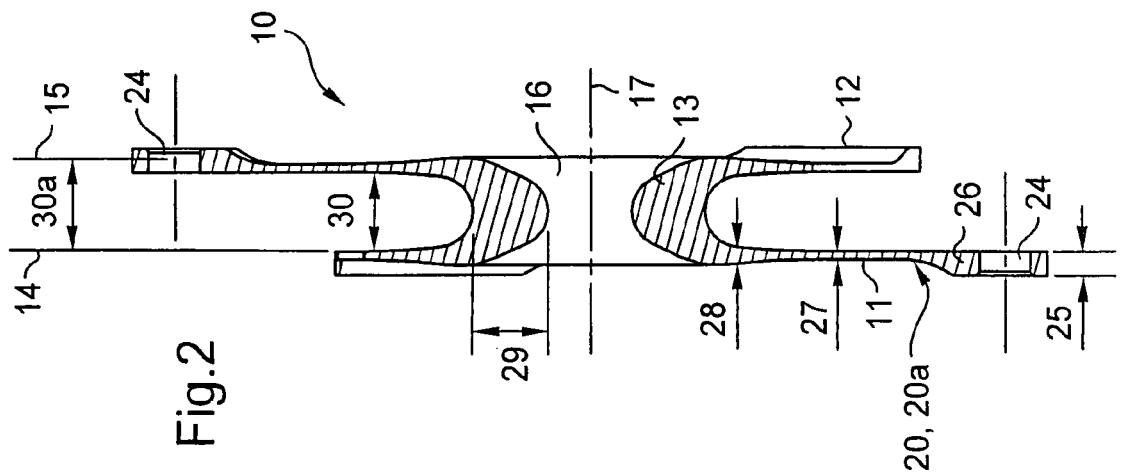
Figure 1:
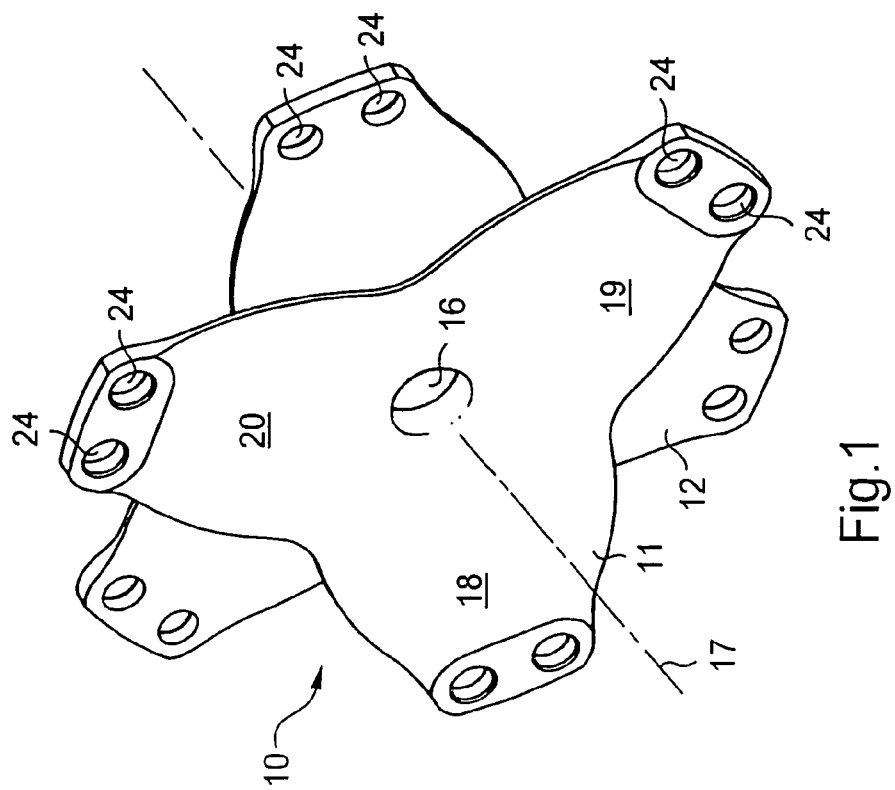
FIG. 1 is a perspective view showing a coupling part in accordance with the invention.
Figure 5:
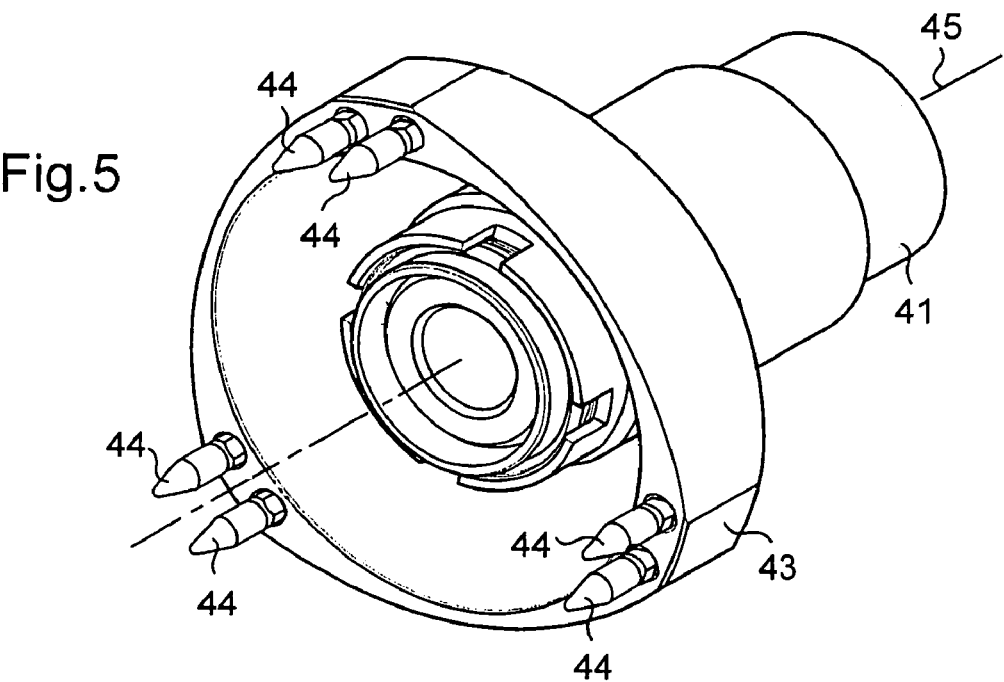
FIG. 5 is a perspective view showing a fastening flange fitted to one end of a shaft to be coupled.
Figure 6:
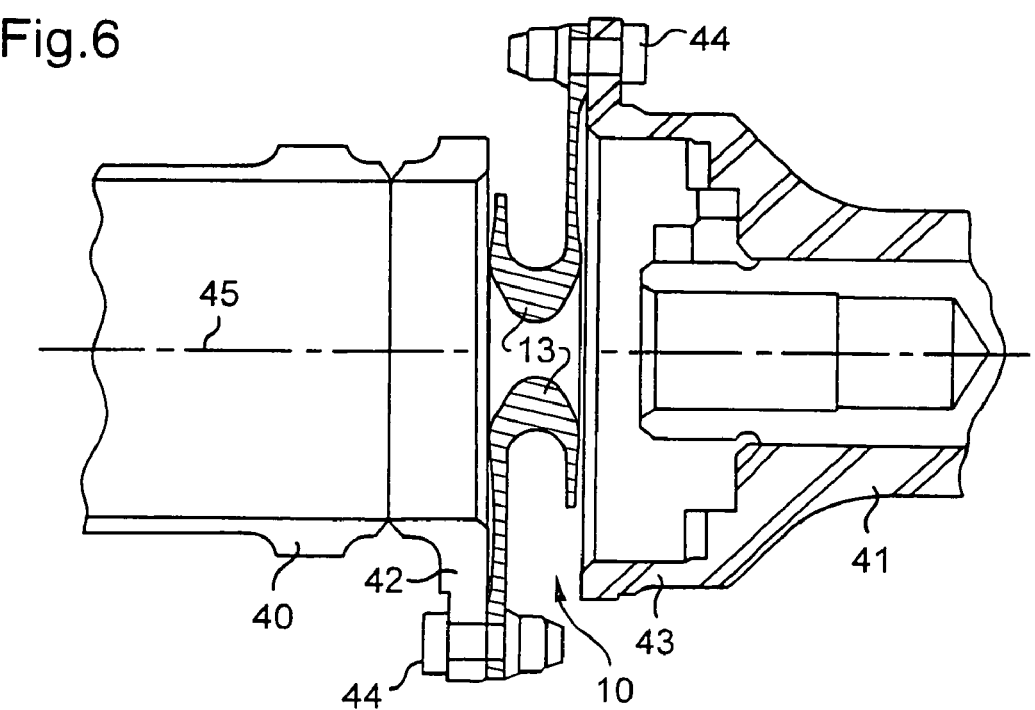
FIG. 6 is a fragmentary diagrammatic section view of a plane containing the common axis of rotation showing the coupling between the shaft ends shown in FIG. 4.

FIGS. 4 to 6 show the part of FIGS. 1 to 3 in use for coupling together two shafts or rotary systems lying on a common axis and operating at substantially constant velocity; FIG. 4 is a perspective view showing portions of two shafts united by a coupling incorporating the part; FIG. 5 is a perspective view showing a fastening flange fitted to one end of a shaft to be coupled, said flange being provided with fastener members adapted to fastener orifices provided in the periphery of each arm of the coupling part; and FIG. 6 is a fragmentary diagrammatic section view on a plane containing the common axis of rotation showing the coupling between the shaft ends shown in FIG. 4.

With reference to FIGS. 1 to 3 in particular, the part 10 comprises two identical thin webs or portions 11 and 12 that are united in their central region by a hub 13.

The portion 11 extends in a plane 14 and the portion 12 extends in a plane 15 which is parallel to the plane 14; the hub 13 is pierced by a passage or orifice 16 extending along an axis 17 orthogonal to the planes of the webs 11 and 12 (FIG. 2).

The thin portions 11 and 12 may be thought of as plates, flanges, etc., depending in particular on the shape of their outline when seen in a plan view; the plate 11 has three arms or lugs 18, 19, and 20 that are identical and that extend along three coplanar axes 21 to 23 and that meet on the axis 17, forming in pairs three angles of 120°.

Each arm is pierced by two orifices 24 which are surrounded by a peripheral portion 26 of thickness 25; this peripheral portion 26 presents thickness that is greater than the thickness 27 of the intermediate portion (such as 20a for the arm 20); the central portion of each arm extending close to the hub 13 presents a thickness 28 that is greater than the thickness 27 of the middle or intermediate zone of the arm; between these zones, the thickness of the arm varies continuously.

The hub 13 presents maximum thickness 29 in a midplane parallel to the planes 14 and 15 and situated at equal distances therefrom; the spacing 30a between the planes 14 and 15 and/or the spacing 30 between the thin portions 11 and 12 is preferably of the order of 10 mm to 15 mm, so as to avoid concentrating mechanical stress in the hub.

The orifice or passage 16 passing through the center of the hub 13 along the axis 17 presents a diameter that decreases from a position situated in one of the planes 14 and 15 corresponding to one of the axial ends of said passage, to a middle position between the planes; said passage thus presenting in succession a converging portion followed by a diverging portion.

As shown in FIG. 3 in particular, the outline of each arm is constituted by a succession of circular arcs giving each plate the general shape of a curvilinear hexagon or triangle, thus making it possible to avoid, or at least limit, concentrations of mechanical stress.

With reference to FIGS. 4 to 6, each end 40, 41 of a shaft carries a respective flange 42, 43; each flange receives three pairs of fastener members 44 disposed on a radius relative to the common axis 45 of rotation of the two shafts that corresponds to the distance between the axes of the orifices 24 and the axis 17 of the part 10.

In addition, the spacing and the diameter of the two members 44 in a pair of members are respectively adapted to the spacing and to the diameter of the two orifices 24 of a pair of orifices as provided in each of the arms of the part 10.

The part 10 is fastened to the two flanges 42 and 43 that face each other via respective ones of the end plates, having their peripheral portions 25 clamped by the fastener members 44 (FIGS. 4 and 6).

Each fastener member 44 is preferably constituted by a bolt or a pin, a nut, and/or a washer.

When the shafts 40 and 41 are coupled together by the part 10 and ready for operating as a transmission, the rotary axes of the shafts coincide substantially with the axis of symmetry 17 of the part 10, but can present an angular offset and a misalignment on an axis contained in a plane orthogonal to the axes 17 and 45 because of the flexibility of the arms of the plates 11 and 12 of the coupling part 10.

What is claimed is:

1. A coupling device interconnecting two substantially constant velocity systems or shafts, the device comprising:
   two parallel plates each having a central region and at least two arms extending from the central region;
   a cylindrical hub homogenously uniting the plates as a one-piece homogenous construction therewith,
   wherein the plates are offset angularly about an axial centerline extending orthogonally through centers of the plates, and
   wherein each plate presents a first cross-sectional thickness in a first region adjacent the hub, a second cross-sectional thickness in a second region furthest from the hub, and a third cross-sectional thickness in third region extending between the first and second regions, the third thickness being less than the first thickness and less than the second thickness.

2. The device according to claim 1, wherein the hub presents a first inside diameter at two axial ends of said hub, and presents, in a central or middle portion of said hub, a second inside diameter that is smaller than the first inside diameter.

3. The device according to claim 1, wherein the center of the hub is pierced by an orifice or passage extending along said axial centerline and presenting a diameter that decreases from an axial end position to a middle position, the passage thus presenting in succession a converging portion followed by a diverging portion.

4. The device according to claim 1, wherein said at least two arms are three identical arms spaced apart at 120° intervals about said axial centerline.

5. The device according to claim 1, wherein the thickness of each plate varies continuously in regions lying between the first region and the third region.

6. The device according to claim 1, wherein each arm is pierced by at least one orifice or bore at least in said second region.

7. The device according to claim 1, wherein each plate presents an outline in the form of a curvilinear isosceles triangle, the plates being offset by 60° in rotation about the axial centerline.

8. The device according to claim 1, wherein a part forming at least one of the plates, the sleeve and the hub, is made of metal.

9. The device according to claim 8, wherein a part forming at least one of the plates, the hub and the sleeve is made of titanium, of steel, or of aluminum alloy.

10. The device according to claim 1, wherein a part forming at least one of the plates, the hub and the sleeve, is made of composite material.

11. The device according to claim 1, made by molding.

12. The device according to claim 1, wherein the hub has an hourglass-shaped orifice extending centrally therethrough, the orifice having entry and exit diameters that are each greater than a middle diameter thereof.

13. The device according to claim 1, wherein the hub has a maximum thickness at a midplane perpendicular to the axial centerline, said midplane being equidistant between planes passing through said plates.

14. The device according to claim 1, wherein said arms are elastically deformable and are configured to deform independently of each other.

15. A coupling device interconnecting two shafts transmitting power between a rotor of a rotary wing aircraft and a rotor drive motor, the device comprising:

two parallel plates each having a central region and three identical arms spaced apart from one another at 120° intervals about an axial centerline extending orthogonally through centers of the plates, the arms of one of the plates are offset angularly by 60°, about the axial centerline, from the arms of another of said plates;

a cylindrical hub homogenously uniting the plates as a one-piece construction therewith, and having an hourglass-shaped orifice extending centrally therethrough, the orifice having entry and exit diameters that are each greater than a middle diameter thereof, wherein each arm presents a first thickness in a first region adjacent to the hub, a second thickness in a second region furthest from the hub, and a third thickness in third region extending between the first and second regions, the third thickness being less than the first thickness and less than the second thickness in a direction parallel to the axial centerline.

16. The device according to claim 15, wherein the thickness of each plate varies continuously in the regions lying between the first region and the third region.

17. The device according to claim 15, wherein each plate is pierced by at least one orifice or bore at least in the second region region.

* * * * *